March 25, 1924.

W. C. STEWART

BRAKE MECHANISM

Original Filed May 15, 1916    2 Sheets-Sheet 1

1,487,763

INVENTOR_
William C. Stewart.

March 25, 1924.
W. C. STEWART
1,487,763
BRAKE MECHANISM
Original Filed May 15, 1916  2 Sheets-Sheet 2
Fig. 2.
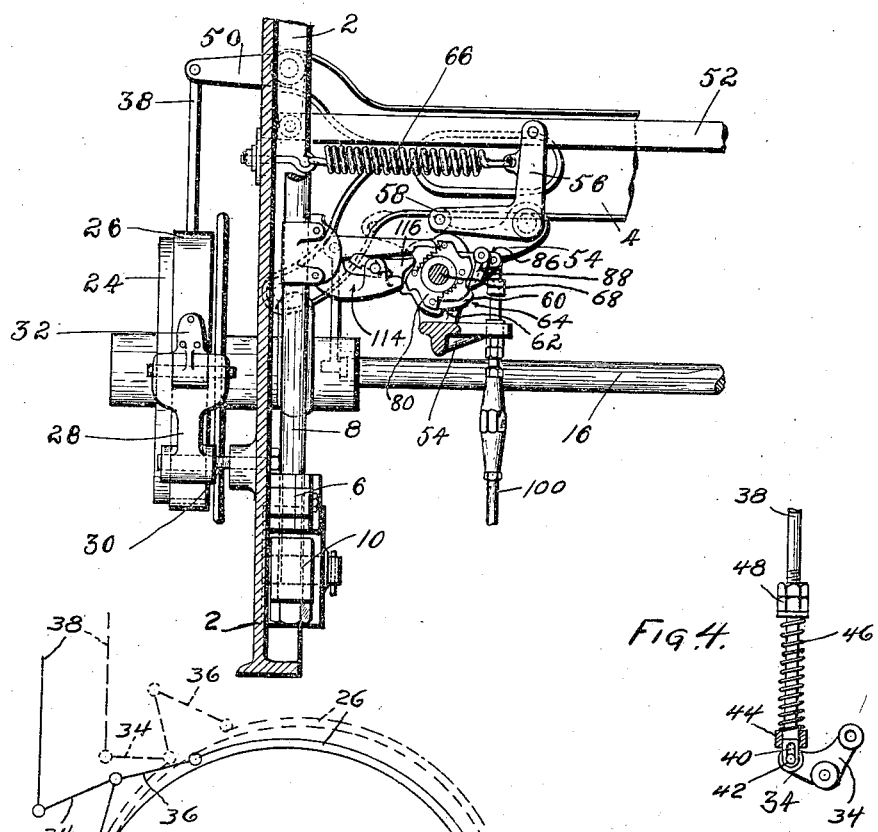
Fig. 4.
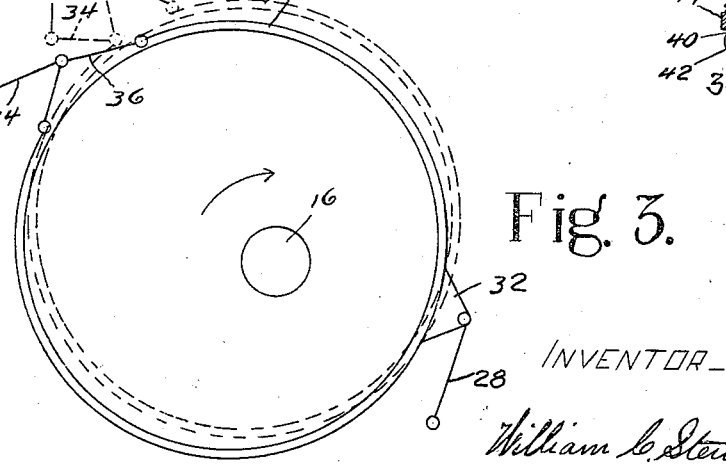
Fig. 3.
INVENTOR
William C. Stewart Patented Mar. 25, 1924.

1,487,763

UNITED STATES PATENT OFFICE.

WILLIAM C. STEWART, OF SWAMPSCOTT, MASSACHUSETTS, ASSIGNOR TO UNITED SHOE MACHINERY CORPORATION, OF PATERSON, NEW JERSEY, A CORPORATION OF NEW JERSEY.

BRAKE MECHANISM.

Original application filed May 15, 1916, Serial No. 97,583. Divided and this application filed July 2, 1920. Serial No. 393,598.

*To all whom it may concern:*

Be it known that I, WILLIAM C. STEWART, a subject of the King of England, residing at Swampscott, in the county of Essex and State of Massachusetts, have invented certain Improvements in Brake Mechanisms, of which the following description, in connection with the accompanying drawings, is a specification, like reference characters on the drawings indicating like parts in the several figures.

This invention relates to machine controlling mechanisms and more particularly to stopping or braking mechanisms for bringing machine parts to rest when the driving clutch or other driving element is disengaged from the source of power.

The present application is a division of application Serial No. 97,583, filed May 15, 1916, which has matured into Patent No. 1,429,302, September 19, 1922, in which is shown, in connection with the braking mechanism, a stopping and starting mechanism of general utility designed to provide positive insurance against accidental repetition of the operative movements of the machine in which it is embodied.

It is an object of this invention to provide a brake or stop mechanism which is especially simple in construction and efficient in operation, which is applied yieldingly so as to avoid excessive shock and minimize the strain upon the operatng parts of the brake, but which operates to bring the parts of the machine to rest accurately and without delay in the same predetermined relation after each operation, and to improve otherwise upon prior constructions of this type of mechanism.

An important feature of the invention resides in the provision of a brake band arranged to surround a brake drum mounted in eccentric relation to its axis of rotation and to be tightened by the action of the drum.

In the drawings:—

Fig. 2 is a view in front elevation, with portions broken away and other portions shown in vertical section, of the lower portion of a gearless sole cutting machine including mechanism in which the invention is embodied;

Fig. 3 is a diagrammatic view illustrating the operation of the brake; and

Fig. 4 shows in detail a portion of the brake operating means.

Figure 1:
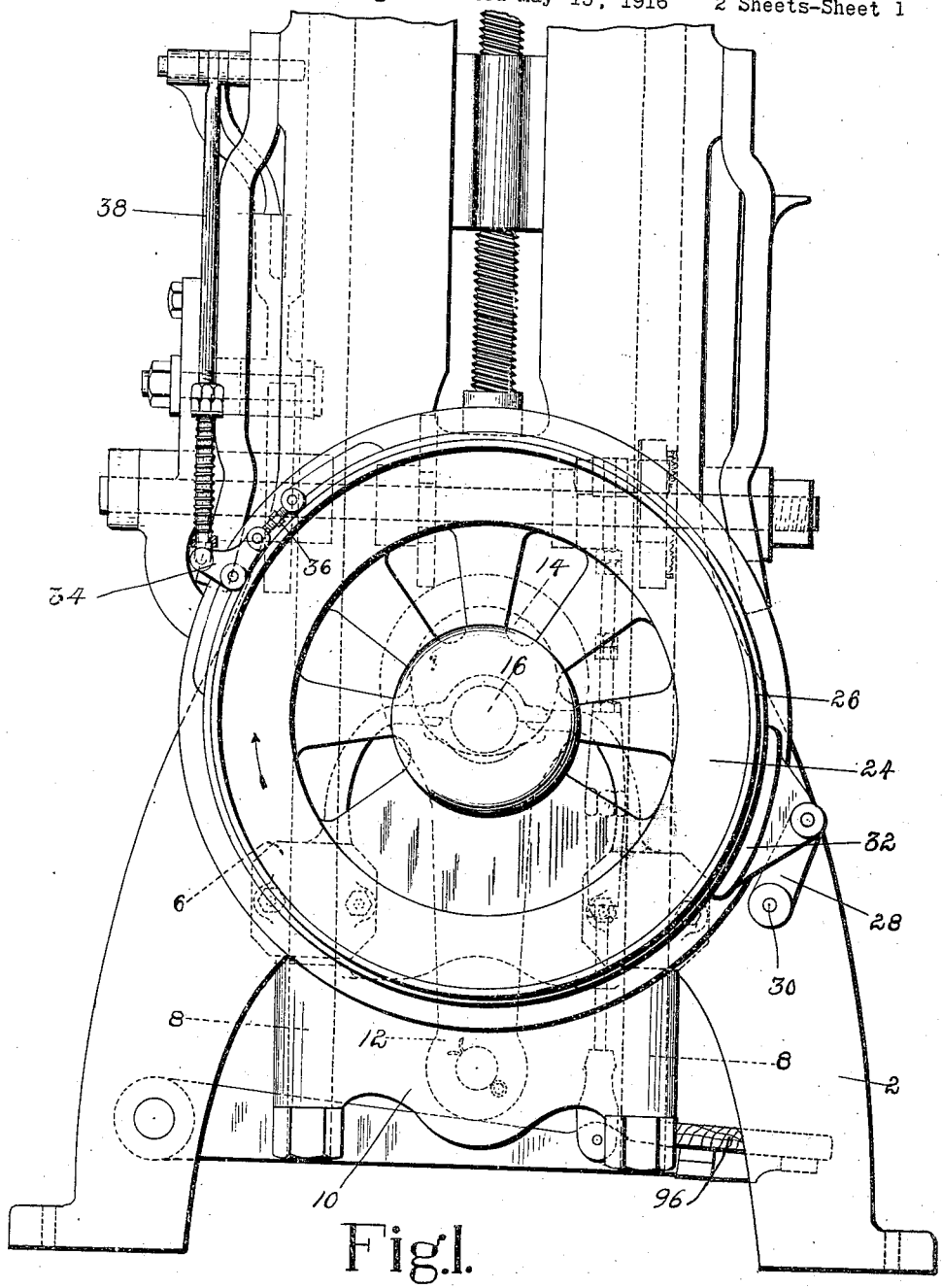
Fig. 1 is a view in end elevation of the lower portion of a gearless sole cutting machine showing the brake drum and the brake band of the illustrative construction in solid lines instead of in dotted lines as in the parent case.

The machine in which mechanism embodying this invention is shown as incorporated comprises upright frame castings 2 at opposite ends connected at the front and the back by cross-pieces 4. The frame supports in the usual way a cutting block (not shown) upon which a sheet of stock is placed in position for the dieing-out operation. The end castings 2 are provided with bearings 6 for four vertical rods 8 which support at their upper ends in the usual way a platen or beam (not shown) which extends over the cutting block. The rods 8 are connected at their lower ends by yokes 10, and on each yoke is pivoted a pitman 12 which embraces an eccentric 14 on a driving shaft 16, the shaft extending longitudinally of the machine beneath the cutting block and rotating in bearings in the frame castings 2. In the normal stationary positions of the parts the high points of the eccentrics 14 are above the shaft 16 in substantially vertical alinement with the center of the shaft, thus holding the beam upraised from the cutting block in position to permit a die to be placed in the desired location upon the stock. In the operation of the machine, after the die has been properly positioned, the shaft 16 is caused to make a single revolution, thus lowering the beam into engagement with the die to effect a cutting operation and then returning the beam to its starting position.

At one end of the shaft 16 is a brake for stopping the rotation of the shaft in the desired position, the brake comprising a drum 24 secured to the shaft and a flexible band 26 which in the construction shown almost completely encircles the drum. The band is anchored at one side of the drum on an arm 28 which is pivoted on a stud 30 projecting from the casting 2, the arm 28 being pivotally connected to a shoe 32 which is secured to the band. Pivotally mounted on one end of the band 26 on the opposite side of the drum is a bell crank 34 one arm of which is connected by means of a link 36 to the other end of the band, and connected to the other arm of the bell crank is a rod 38 through which the operation of the brake is effected. It will be readily understood by reference to Figs. 1 and 4 that downward movement of the rod 38 will serve to draw the ends of the brake band more closely together and thus apply the brake and that upward movement of the rod will serve to loosen the band and thus release the brake. In order to minimize the shock upon the rod 38 and connected parts when the brake is suddenly applied, the rod is provided with a slot 40 to receive a pin 42 on the bell crank 34, and the bell crank bears against a collar 44 which is mounted to slide upwardly on the rod 38 against the tension of a spring 46 the other end of which bears against a stationary collar 48 on the rod. A yielding connection is thus afforded between the rod 38 and the bell crank 34 to absorb any shock incidental to the application of the brake.

The rod 38 is connected at its upper end to one arm of a bell crank 50 which is pivoted on the casting 2, and the other arm of this bell crank is connected by means of a rod 52 to the clutch lever (not shown) at the opposite end of the machine.

Extending transversely of the machine and suspended at opposite ends from the cross pieces 4 is a bracket 54 on a portion of which is pivoted a bell crank 56 having an upwardly extending arm pivotally connected to the rod 52 and a laterally extending arm provided with a roll 58 which rests upon the periphery of a controlling member comprising a wheel 60 having alternate depressions 62 and elevations or cams 64. A strong spring 66 anchored at one end to one of the frame members 2 and connected at its other end to the bell crank 56 tends to swing the bell crank in a direction to move the rod 52 toward the left (Fig. 2) and thus set the clutch and release the brake to cause the machine to be operated. The spring is permitted to effect such movement of the rod 52 when one of the depressions 62 in the wheel 60 is carried under the roll 58 by movement of the wheel in a clockwise direction (Fig. 2). The cams 64, on the other hand, serve to operate the bell crank in opposition to the spring 66 to cause the release of the clutch and the application of the brake and thus to stop the rotation of the shaft 16.

By reference to Fig. 3 it will be seen that the brake drum 24 is eccentric to the shaft 16 on which it is mounted, the degree of eccentricity being exaggerated in this figure for the purpose of clearer illustration of the resulting effect. The position of the eccentric on the shaft is such with reference to the cycle of operations, that when the brake is applied through downward movement of the rod 38 the high portion of the eccentric is engaging that portion of the brake band with which the rod 38 is connected, as shown by full lines in Fig. 3. Between the time when the brake is first applied and the time when the parts are brought to rest the drum moves from the full line position to the dotted line position shown in Fig. 3, the effect of which is to swing the entire brake band about its anchorage on the arm 28 and thus turn the bell crank 34 relatively to the rod 38, which is stationary at this time, in such manner as to tighten the band still further. The brake is thus applied preliminarily by the action of the rod 38, and the braking action is increased automatically through the movement of the driven mechanism. Accidental failure of the brake to work properly is thus guarded against under all usual working conditions.

Sleeved upon a hub on the shaft 68 is an arm 86 upon which is pivoted a pawl 88 for engagement with the teeth of the ratchet wheel 80. For connecting the arm 86 to an operating treadle 96 (Fig. 1) there is provided a rod 100, the treadle preferably extending for a considerable distance lengthwise of the machine and being pivoted in bearings in the frame castings 2. Conveniently, a spring (not shown) supports the treadle in its uppermost position, downward movement of the treadle serving to rotate the ratchet wheel 80 and the shaft 68. The exact amount of movement of the treadle to turn the ratchet wheel 80 the required distance is ensured by stops (not shown) on the frame of the machine, this movement serving to carry one of the depressions 62 in the periphery of the controller wheel 60 beneath the roll 58 and thereby causing the rod 52 to be operated by the spring 66 to set the clutch and release the brake. The treadle may then be released to permit the pawl 88 to return to its starting position.

Controller wheel 60 having been turned through the action of the treadle the required distance to cause the machine to operate, the succeeding movement of the wheel, in the same direction, to carry the cam 64 beneath the roll 58 and thereby positively operate the rod 52 to release the clutch and apply the brake and thus stop the shaft 16 at the end of one revolution, is to be effected automatically by the operation of the driven mechanism. To this end, one of the rods 8 carries a bracket 114 on which is pivoted the pawl 116 positioned normally by gravity with its front end resting on the bracket, as shown in Fig. 2. When the rods 8 move downwardly during the first half revolution of the shaft 16, the pawl 116 lifts and passes idly by the teeth of the ratchet wheel 80, but on the upward movement of the rods 8, after the cutting operation has been effected, the pawl 116 engages a tooth of the ratchet wheel 80 and causes the shaft 68 and the controller wheel 60 to turn the required distance to operate the bell crank 56 and thus stop the machine. The bracket 114 is adjustable on the rod 8 to permit the pawl 116 to be properly positioned. It will be apparent that the operator may safely keep the treadle depressed until after the upward movement of the pawl 116, since the teeth on the wheel 80 will pass idly by the pawl 88. Before starting the machine a second time it is necessary to release the treadle and permit it to swing to its limit of upward movement. For a more detailed description of the treadle-operated parts reference should be had to the parent case referred to above.

In the normal operation of the machine the operator depresses the treadle 96 and through the action of the pawl 88 on the ratchet wheel 80, turns the shaft 68 and the controller wheel 60 far enough to permit the roll 58 to drop into the next succeeding depression 62 on the wheel, thus permitting the spring 66 to act upon the rod 52 to set the clutch (not shown) and release the brake. The shaft 16 is thus set in motion and through the eccentrics 14 and the pitman 12 depresses the rods 8 and the beam (not shown) to cause the beam to act upon the work and then raises the rods to return the beam to the starting position. During the latter portion of the upward movement of the rods 8 the pawl 116 engages the ratchet wheel 80 to turn the shaft 68 to carry the next succeeding cam 64 on the controller wheel 60 beneath the roll 58, thus operating the bell crank 56 to release the clutch and set the brake whereby the parts are brought to rest in starting position.

While the various features of the invention, including the novel braking means, are shown and described herein as applied to a machine particularly designed for cutting soles or the like, it should be understood that the invention is not thus restricted in utility but is applicable to machines of various types.

Having described the invention, what I claim as new and desire to secure by Letters Patent of the United States is:—

1. In a machine of the class described, the combination with a shaft, of a brake drum on the shaft, a brake band on said drum, means for applying the brake comprising connections to opposite ends of said band for tightening the band on the drum, the drum being eccentric to the shaft, and means for operating the brake applying means at such time in the rotation of the shaft as to cause the drum to operate said connections to increase the braking action of the band.

2. In mechanism of the class described, the combination with a shaft, of a brake drum on the shaft, a brake band on said drum, means for applying the brake comprising connections between opposite ends of said band and a rod for operating said connections to tighten the band on the drum, the drum being eccentric to the shaft, and means for operating said rod to apply the brake at such time in the rotation of the shaft as to cause the drum to operate said connections relatively to the rod to increase the braking action of the band.

3. In mechanism of the class described, the combination with a shaft, of a brake drum on the shaft, a brake band on said drum, means for applying the brake comprising a bell crank pivoted on one end of said band, a link connecting one arm of said bell crank to the other end of the band and means connected to the other arm of the bell crank for operating the bell crank to tighten the band on the drum, the drum being eccentric to the shaft, and means for operating the brake applying means at such time in the rotation of the shaft as to cause the drum to turn the bell crank relatively to its operating means to increase the braking action of the band.

4. In mechanism of the class described, the combination with a shaft, of a brake drum on the shaft, a brake band on said drum, means for pivotally supporting the brake band at one side of the drum to permit it to swing in the plane of the drum, means for applying the brake comprising connections between opposite ends of the brake band at the opposite side of the drum from said pivotal support and a rod for operating said connections to tighten the band on the drum, the drum being eccentric to the shaft, and means for operating said rod to apply the brake at such time in the rotation of the shaft as to cause the drum to swing the band about its supporting means and operate said connections relatively to the rod to effect a further tightening of the band.

5. In mechanism of the class described, the combination with a shaft, of a brake drum eccentrically mounted on the shaft, a brake band on said drum, and means for applying the brake comprising connections to opposite ends of the band for tightening the band on the drum, said connections including parts relatively movable against yielding resistance for absorbing the shock incident to the application of the brake.

6. In mechanism of the class described, a rotatable brake drum mounted in eccentric relation to its axis of rotation, a brake band on said drum, and means connected to said band for tightening the band on the drum, said means being so constructed and arranged in relation to the drum as to cause the band to be further tightened by the action of the drum.

7. In mechanism of the class described, a rotatable brake drum mounted in eccentric relation to its axis of rotation, a brake band on said drum, brake applying means connected to said band, and mechanism for operating said brake applying means to tighten the band on the drum, said brake applying means being so constructed and arranged in relation to said drum and operating mechanism as to cause said means to be operated by the eccentric drum to increase the braking action of the band.

8. In mechanism of the class described, a rotatable brake drum mounted in eccentric relation to its axis of rotation, a brake band on said drum, and means for tightening said band on the drum at such a point in the cycle of rotation of the drum as to cause the band to be further tightened by the action of the eccentric drum.

9. In mechanism of the class described, a rotatable brake drum mounted in eccentric relation to its axis of rotation, a brake band on said drum, a member connected to the band for tightening the band on the drum, and mechanism for operating said member to tighten the band at such a point in the cycle of rotation of the drum as to cause movement of said member relatively to its operating mechanism to be effected by the action of the eccentric drum for further tightening the band on the drum.

10. In mechanism of the class described, a rotatable brake drum mounted in eccentric relation to its axis of rotation, a brake band encircling the drum, brake applying means connected to said band, and mechanism for operating said brake applying means to tighten the band on the drum at a predetermined point in the cycle of rotation of the drum.

11. In mechanism of the class described, a rotatable brake drum, a brake band on said drum, means for supporting the band in such manner as to permit it to move bodily in the plane of the drum, the drum being mounted in eccentric relation to its axis of rotation, brake applying means connected to the band, and mechanism for operating said brake applying means at such a point in the cycle of rotation of the drum as to cause said means to be further operated by bodily movement of the band in such manner as to increase the braking action of the band.

12. In mechanism of the class described, a rotatable brake drum, a co-operating brake member for engaging the periphery of said drum to stop the rotation of the drum, the drum being mounted in eccentric relation to its axis of rotation, and means for operating said member at such a point in the cycle of rotation of the drum as to cause the co-operative braking pressure between said drum and member to be increased by the action of the eccentric drum.

13. In mechanism of the class described, a rotatable brake drum, a co-operating brake member for engaging the periphery of said drum to stop the rotation of the drum, the drum being mounted in eccentric relation to its axis of rotation, and mechanism for operating said member to render its braking action effective at a predetermined point in the cycle of rotation of the drum.

14. In mechanism of the class described, a rotatable brake member having a substantially annular brake surface encircling the axis of rotation of said member in eccentric relation to said axis, a co-operating brake member arranged to engage said surface, brake applying means connected to said last named member, and mechanism for operating said brake applying means at such a point in the cycle of rotation of said first named member as to cause the first named member to operate said means to increase the braking pressure.

15. In mechanism of the class described, a rotatable brake member having a substantially annular brake surface encircling the axis of rotation of said member in eccentric relation to said axis, a co-operating brake member arranged to engage said surface, and mechanism for operating said last named member to apply braking pressure at a predetermined point in the cycle of rotation of said first named member.

In testimony whereof I have signed my name to this specification.

WILLIAM C. STEWART.